US012668260B2

(12) United States Patent
Okuno et al.

(10) Patent No.: US 12,668,260 B2
(45) Date of Patent: Jun. 30, 2026

(54) VEHICLE CONGESTION DETERMINATION DEVICE AND VEHICLE DISPLAY CONTROL DEVICE

(71) Applicant: DENSO CORPORATION, Kariya-city (JP)

(72) Inventors: Tatsuya Okuno, Kariya-city (JP); Yusuke Miyake, Kariya-city (JP); Toshiharu Shiratsuchi, Kariya-city (JP); Shiori Maneyama, Kariya-city (JP); Kazuki Izumi, Kariya-city (JP)

(73) Assignee: DENSO CORPORATION, Kariya-city (JP)

( * ) Notice: Subject to any disclaimer, the term of this patent is extended or adjusted under 35 U.S.C. 154(b) by 279 days.

(21) Appl. No.: 18/159,369

(22) Filed: Jan. 25, 2023

(65) Prior Publication Data

US 2023/0166754 A1     Jun. 1, 2023

Related U.S. Application Data

(63) Continuation of application No. PCT/JP2021/028826, filed on Aug. 3, 2021.

(30) Foreign Application Priority Data

Aug. 21, 2020     (JP) ................................. 2020-140156

(51) Int. Cl.
*B60W 50/14*          (2020.01)
*B60K 35/10*          (2024.01)
(Continued)

(52) U.S. Cl.
CPC ............. *B60W 50/14* (2013.01); *B60K 35/10* (2024.01); *B60K 35/215* (2024.01); *B60K 35/22* (2024.01);
(Continued)

(58) Field of Classification Search
CPC .............. B60W 50/14; B60W 60/005; B60W 2554/4041; B60W 2554/4042; B60W 2050/146; G08G 1/0133
(Continued)

(56) References Cited

U.S. PATENT DOCUMENTS

| | | | |
|---|---|---|---|
| 2017/0136878 A1* | 5/2017 | Frank | .................. G01C 21/3697 |
| 2017/0329328 A1* | 11/2017 | Horita | ...................... G08G 1/16 |

(Continued)

FOREIGN PATENT DOCUMENTS

| | | |
|---|---|---|
| JP | 2002-269683 A | 9/2002 |
| JP | 2005324661 A | 11/2005 |

(Continued)

*Primary Examiner* — Helal A Algahaim
*Assistant Examiner* — Patrick M Brady
(74) *Attorney, Agent, or Firm* — Harness, Dickey & Pierce, PLC

(57) ABSTRACT

A vehicle congestion determination device includes: an acquisition unit configured to acquire a first information indicating an occurrence of traffic congestion based on a first threshold value and a second information indicating the occurrence of traffic congestion based on a second threshold value as an allowable condition for starting an autonomous driving operation during the traffic congestion; and a control unit configured to integrate the first information and the second information and execute a first algorithm for determining the occurrence of the traffic congestion based on the first threshold value and a second algorithm for determining the occurrence of the traffic congestion based on the second threshold value.

9 Claims, 8 Drawing Sheets

(51) Int. Cl.

| | |
|---|---|
| *B60K 35/215* | (2024.01) |
| *B60K 35/22* | (2024.01) |
| *B60K 35/23* | (2024.01) |
| *B60K 35/26* | (2024.01) |
| *B60K 35/28* | (2024.01) |
| *B60K 35/29* | (2024.01) |
| *B60K 35/81* | (2024.01) |
| *B60W 60/00* | (2020.01) |
| *G08G 1/01* | (2006.01) |
| *B60K 35/60* | (2024.01) |

(52) U.S. Cl.
CPC ............ *B60K 35/23* (2024.01); *B60K 35/265* (2024.01); *B60K 35/28* (2024.01); *B60K 35/29* (2024.01); *B60K 35/81* (2024.01); *B60W 60/005* (2020.02); *G08G 1/0133* (2013.01); *B60K 35/60* (2024.01); *B60W 2050/146* (2013.01); *B60W 2554/4041* (2020.02); *B60W 2554/4042* (2020.02)

(58) Field of Classification Search
USPC .......................................................... 701/23
See application file for complete search history.

(56) References Cited

U.S. PATENT DOCUMENTS

| | | | |
|---|---|---|---|
| 2019/0039618 A1 | 2/2019 | Mori | |
| 2019/0144004 A1* | 5/2019 | Mimura | B60W 30/16 |
| | | | 701/28 |
| 2019/0317506 A1* | 10/2019 | Ishioka | B60W 50/10 |
| 2019/0354108 A1* | 11/2019 | Okajima | B60R 21/00 |
| 2021/0171042 A1* | 6/2021 | Hayakawa | G08G 1/167 |
| 2021/0286357 A1* | 9/2021 | Oba | B60W 50/082 |
| 2021/0302977 A1* | 9/2021 | Saikyo | B60W 50/14 |
| 2022/0219688 A1* | 7/2022 | Ito | B60W 30/14 |

FOREIGN PATENT DOCUMENTS

| | | |
|---|---|---|
| JP | 2019212071 A | 12/2019 |
| WO | WO-2017154396 A1 | 9/2017 |

* cited by examiner

Ⓐ

S180 — DRIVER CHANGED?

NO → TRANS TO EVAC TRAVEL — S210

YES

S190 — 1ST INF (VICS) SHOWS CONG?

NO

S220 — CONG AHEAD?

NO →

YES

YES

S200 — DISP Lv3 NOT ALLOWED  (SEE FIG. 10)

Ⓑ ←

END

TRAVEL POSITION A                                      120

```
        8 0 k m / h

CONGESTION
AHEAD
```

CID                                  METER DISP

CID                                  METER DISP (TRAVEL POSITION D)

CID                                  METER DISP

VEHICLE CONGESTION DETERMINATION DEVICE AND VEHICLE DISPLAY CONTROL DEVICE

CROSS REFERENCE TO RELATED APPLICATIONS

The present application is a continuation application of International Patent Application No. PCT/JP2021/028826 filed on Aug. 3, 2021, which designated the U.S. and claims the benefit of priority from Japanese Patent Application No. 2020-140156 filed on Aug. 21, 2020. The entire disclosures of all of the above applications are incorporated herein by reference.

TECHNICAL FIELD

The present disclosure relates to a vehicle congestion determination device and a vehicle display control device used in a vehicle having an autonomous driving function.

BACKGROUND

For example, a vehicle control device according to a conceivable technique is known. In the vehicle control device according to a conceivable technique, for example, when driving on a highway, and determining according to traffic congestion information provided by a system such as VICS (Vehicle Information and Communication System, Registered Trademark) that traffic congestion has occurred and the traffic congestion section is a predetermined distance or longer, the device starts the autonomous driving operation (i.e., control for keeping a constant distance from the congested vehicle in front and following up), and stops the autonomous driving operation when the autonomous driving stop condition is satisfied after starting the autonomous driving operation.

As a result, the device can automatically and appropriately start and stop the autonomous driving corresponding to the traffic congestion without giving the troublesome feeling to the driver judging the traffic congestion situation and operating the autonomous driving switch.

SUMMARY

According to an example, a vehicle congestion determination device includes: an acquisition unit configured to acquire a first information indicating an occurrence of traffic congestion based on a first threshold value and a second information indicating the occurrence of traffic congestion based on a second threshold value as an allowable condition for starting an autonomous driving operation during the traffic congestion; and a control unit configured to integrate the first information and the second information and execute a first algorithm for determining the occurrence of the traffic congestion based on the first threshold value and a second algorithm for determining the occurrence of the traffic congestion based on the second threshold value.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Figure 1:
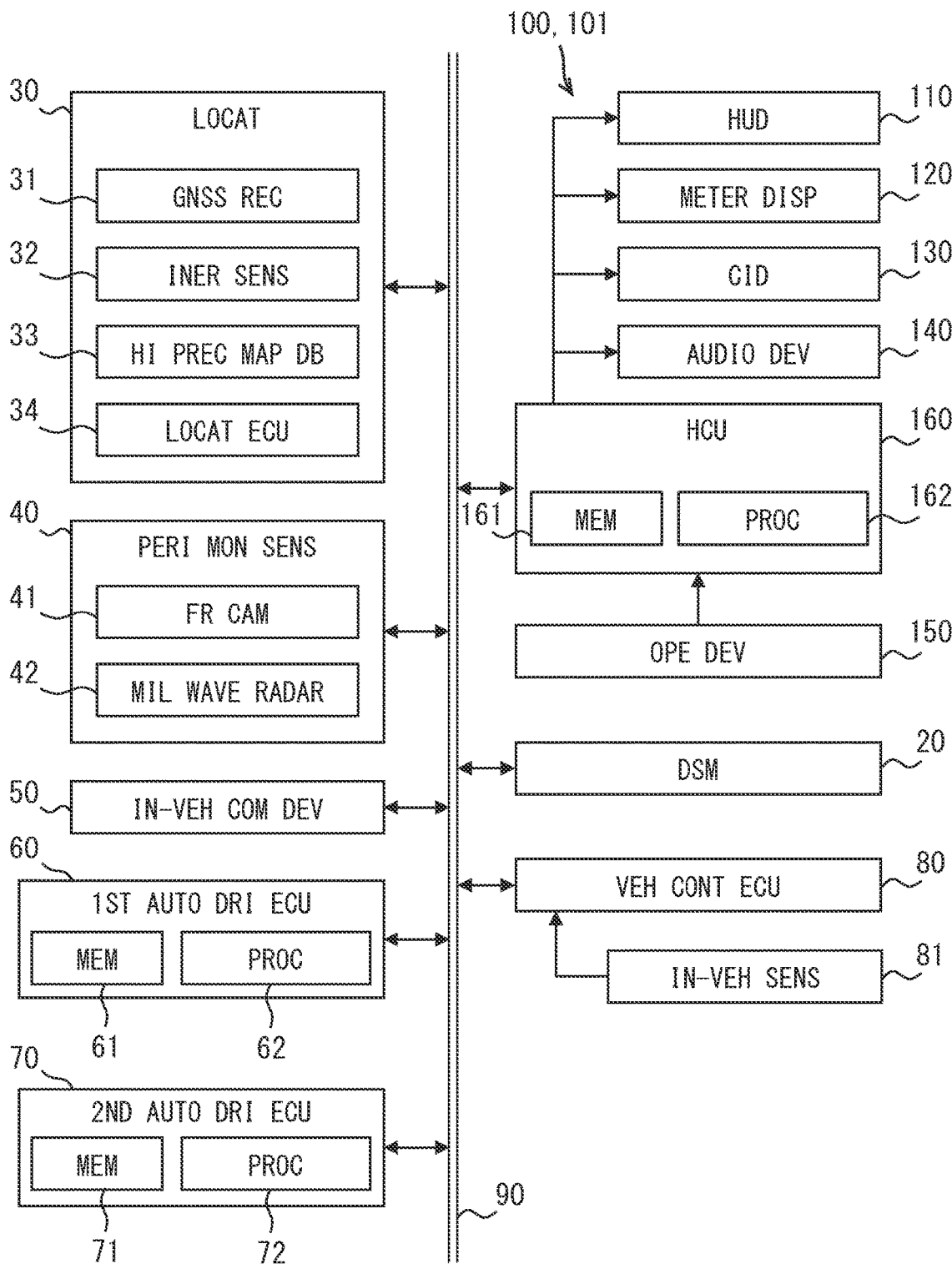
FIG. 1 is an explanatory diagram showing the configuration of a vehicle congestion determination device and a vehicle display control device mounted on a vehicle having an autonomous driving function according to a first embodiment.

In the vehicle control device according to the conceivable technique, it seems that the autonomous driving corresponding to the congestion is smoothly started from the starting point of the congested section obtained by the VICS. However, a device for controlling autonomous driving has a condition for determining whether or not the autonomous driving can be started (for example, a vehicle speed condition that enable the autonomous driving to be started). In order to realize a safe and reliable transition to the autonomous driving, the vehicle speed condition that enables the start of autonomous driving may be, for example, set as a vehicle speed (e.g., 10 km/h), which is lower than the vehicle speed condition (for example, 40 km/h) set for grasping the congestion section in the VICS.

Therefore, even in a case where the vehicle enters a congestion section determined by the VICS while driving, the autonomous driving may not start until the vehicle speed condition for starting the autonomous driving is not satisfied. Thus, there may be a possibility that the driver will feel uncomfortable about the situation that the autonomous driving is not started although the vehicle enters the congestion section.

In view of the above difficulties, an object of the present embodiments is to provide a vehicle congestion determination device that can accurately determine a traffic congestion situation, and a vehicle display control device that can easily conveys to the user that a transition to autonomous driving is to be performed.

The vehicle congestion determination device of the first aspect includes:

an acquisition unit configured to acquire a first information indicating that a traveling speed of an other vehicle in front of a vehicle is smaller than a predetermined first threshold value and a traffic congestion occurs, and a second information indicating that the traffic congestion occurs based on a second threshold value, set to be smaller than the first threshold value, as an allowable condition for starting an autonomous driving operation during the traffic congestion using an autonomous driving function of the vehicle; and a control unit configured to integrate the first information and the second information, and execute a first algorithm for determining an occurrence of the traffic congestion based on the first threshold value and a second algorithm for determining the occurrence of the traffic congestion based on the second threshold value.

According to this aspect, the control unit executes the first algorithm and the second algorithm to determine the occurrence of the traffic congestion, so it is possible to accurately determine the occurrence of traffic congestion.

Further, the vehicle display control device of the second aspect includes:

a display unit configured to display vehicle information;

an acquisition unit configured to acquire a first information indicating that a traveling speed of an other vehicle in front of a vehicle is smaller than a predetermined first threshold value and a traffic congestion occurs, and a second information indicating whether an autonomous driving operation is allowable based on a second threshold value, which is set to be smaller than the first threshold value, as an allowable condition for starting an autonomous driving operation during the traffic congestion using an autonomous driving function of the vehicle; and a display control unit configured to display, on the display unit, an indication that the autonomous driving operation is not allowable when the first information satisfies the first threshold value and the second information does not satisfy the second threshold value.

According to this aspect, even if the first information shows that the traffic congestion occurs, the display control unit displays on the display unit that the autonomous driving operation is not allowable unless the second information does not satisfy the second threshold value. Thus, it is possible to clearly inform the user that the transition to the autonomous driving operation is not yet allowable. In other words, the transition to the autonomous driving operation can be conveyed to the user in an easy-to-understand manner.

Hereinafter, embodiments for implementing the present disclosure will be described referring to drawings. In each embodiment, portions corresponding to the elements described in the preceding embodiments are denoted by the same reference numerals, and redundant explanation may be omitted. When only a part of a configuration is described in an embodiment, another preceding embodiment may be applied to the other parts of the configuration. It may be possible not only to combine parts the combination of which is explicitly described in an embodiment, but also to combine parts of respective embodiments the combination of which is not explicitly described if any obstacle does not especially occur in combining the parts of the respective embodiments.

First Embodiment

A vehicle congestion determination device 100 and a vehicle display control device 101 of the first embodiment will be described with reference to FIGS. 1 to 10. The vehicle congestion determination device 100 and the vehicle display control device 101 of the first embodiment are mounted (applied) to a vehicle having an autonomous driving function. Hereinafter, the vehicle congestion determination device 100 will be referred to as the congestion determination device 100 and the vehicle display control device 101 will be referred to as the display control device 101.

The congestion determination device 100 and the display control device 101 are provided with an HCU (Human Machine Interface Control Unit) 160 as shown in FIG. 1. The traffic congestion determination device 100 determines the occurrence of traffic congestion, and the display control device 101 displays various vehicle information on the display unit (for example, the meter display 120). The various types of vehicle information are, for example, vehicle travel information (e.g., vehicle speed and the like), an occurrence situation of traffic congestion when traveling on a highway, availability of the autonomous driving, and the like.

The traffic congestion determination device 100 and the display control device 101 are connected to a DSM (Driver Status Monitor) 20 mounted on the vehicle, a locator 30, a periphery monitoring sensor 40, an in-vehicle communication device 50, a first autonomous driving ECU 60, a second autonomous driving ECU 70, and a vehicle control ECU 80 via a communication bus 90 and the like.

The DSM 20 includes a near infrared light source, a near infrared camera, and a control unit for controlling the near infrared light source and the near infrared camera. The DSM 20 is installed, for example, on the upper surface of the steering column portion or the upper surface of an instrument panel, so that the near-infrared camera faces the headrest portion of the driver's seat. The DSM 20 uses the near-infrared camera to capture the driver's face to which the near-infrared light is emitted from the near-infrared light source. An image captured by the near-infrared camera is subjected to image analysis by the control unit. The control unit extracts information such as the driver's eye point position and line-of-sight direction from the captured image, and provides the extracted driver status information (such as sleeping, looking aside, occurrence of illness, and the like) to the HCU 160 and the like via the communication bus 90.

The locator 30 generates position information of the vehicle by a complex positioning method that combines multiple types and pieces of acquired information. The locator 30 includes a GNSS (Global Navigation Satellite System) receiver 31, an inertial sensor 32, and a map database (hereinafter, map DB) 33, and a locator ECU 34 and the like.

The GNSS receiver 31 receives positioning signals from multiple positioning satellites.

The inertial sensor 32 is a sensor that detects the inertial force acting on the vehicle. The inertia sensor 32 includes a gyro sensor and an acceleration sensor, for example.

The map DB 33 is a nonvolatile memory, and stores map data such as link data, node data, road shape, structures and the like. The map data may include a three-dimensional map including feature points of road shapes and buildings. The three-dimensional map may be generated by REM (Road Experience Management) based on captured images. Further, the map data may include traffic regulation information, road construction information, meteorological information, signal information and the like. The map data stored in the map DB 33 updates regularly or at any time based on the latest information received by the in-vehicle communication device 50.

The locator ECU 34 mainly includes a microcomputer equipped with a processor, a memory, an input/output interface, and a bus connecting these elements. The locator ECU 34 combines the positioning signals received by the GNSS receiver 31, the measurement results of the inertial sensor 32, and the map data of the map DB 33 to sequentially detect the vehicle position (hereinafter, subject vehicle position) of the vehicle.

The vehicle position may include, for example, coordinates of latitude and longitude. It should be noted that the position of the subject vehicle may be determined using the traveling distance obtained from the signals sequentially output from the in-vehicle sensor 81 (i.e., the vehicle speed sensor or the like) mounted on the vehicle. When a three-dimensional map provided by a road shape and a point group of feature points of a structure is used as map data, the locator ECU 34 may specify the position of the own vehicle by using the three-dimensional map and the detection results of the periphery monitoring sensor 40 without using the GNSS receiver 31.

The periphery monitoring sensor 40 is an autonomous sensor that monitors a periphery environment of the subject vehicle. The periphery monitoring sensor 40 can detect moving objects and stationary objects in a detection range around the subject vehicle. For example, the moving objects may include pedestrians, cyclists, non-human animals, and other vehicles, and the stationary objects may include falling objects on the road, guardrails, curbs, road signs, lane markings, road markings such as a center divider, and structures beside the road. The periphery monitoring sensor 40 provides the detection information of detecting an object around the vehicle to the first autonomous driving ECU 60, the second autonomous driving ECU 70, and the like through the communication bus 90. The periphery monitoring sensor 40 includes a front camera 41, one or more millimeter wave radars 42, and the like as detection configurations for object detection.

The front camera 41 outputs, as detection information, at least one of image data obtained by photographing a front range of the vehicle or an analysis result of the image data.

The multiple millimeter wave radars 42 are arranged, for example, on front and rear bumpers of the vehicle at intervals from one another. The millimeter wave radars 42 emit millimeter waves or quasi-millimeter waves toward the front range, a front side range, a rear range, and a rear side range of the vehicle. Each millimeter wave radar 42 generates detection information by a process of receiving millimeter waves reflected by moving objects, stationary objects, or the like. The periphery monitoring sensor 40 may include other detection configurations such as LiDAR (Light Detection and Ranging/Laser Imaging Detection and Ranging) that detects a point group of feature points of a construction, and a sonar that receives reflected waves of ultrasonic waves.

The in-vehicle communication device 50 is a communication module mounted on the vehicle. The in-vehicle communication device 50 has at least a V2N (Vehicle to cellular Network) communication function in line with communication standards such as LTE (Long Term Evolution) and 5G, and sends and receives radio waves to and from base stations and the like around the vehicle. The in-vehicle communication device 50 may further have functions such as road-to-vehicle (Vehicle to roadside Infrastructure, hereinafter "V2I") communication and inter-vehicle (Vehicle to Vehicle, hereinafter "V2V") communication. The in-vehicle communication device 50 enables cooperation between a cloud system and an in-vehicle system (Cloud to Car) by V2N communication. By mounting the in-vehicle communication device 50, the vehicle as a connected car is able to connect to the Internet.

The in-vehicle communication device 50 acquires road traffic information such as road traffic conditions and traffic regulations from FM multiplex broadcasting and beacons provided on roads by using VICS (Vehicle Information and Communication System), for example. In the VICS, for example, a judgment speed (i.e., a first threshold value) is determined in advance for each road (such as an ordinary road, an highway, and the like), and when the vehicle speed on each road falls below the judgment speed, it is determined that the traffic congestion occurs. For this judgement speed, for example, a value such as 10 km/h is used for ordinary roads and 40 km/h for highways. The in-vehicle communication device 50 corresponds to an acquisition unit that acquires the first information (i.e., occurrence of traffic congestion detected by the VICS) based on a first threshold.

Also, the in-vehicle communication device 50 communicates with a plurality of preceding vehicles via a predetermined center base station or between vehicles by using a DCM (Data Communication Module) or vehicle-to-vehicle communication, for example. Then, the in-vehicle communication device 50 obtains information such as the vehicle speed and the position of the vehicle traveling in front of the subject vehicle, and obtains in real time the state of traffic congestion (or a congestion area) in front of the subject vehicle. In the DCM (or the vehicle-to-vehicle communication), in order to grasp the actual occurrence of traffic congestion, a judgment speed (i.e., a second threshold) is predetermined, and when the acquired vehicle speed falls below the judgment speed, it is determined that the traffic congestion occurs. For the judgment speed, for example, a value such as 10 km/h is used on a highway. The in-vehicle communication device 50 corresponds to an acquisition unit that acquires the second information (i.e., the occurrence of congestion detected by the DCM) based on the second threshold, as described above.

The in-vehicle communication device 50 provides congestion information based on VICS or DCM to the second autonomous driving ECU 70, the HCU 160, and the like.

The first autonomous driving ECU 60 and the second autonomous driving ECU 70 are configured to mainly include a computer including a processor 62, 72, a memory 61, 71, an input/output interface, and a bus connecting them, respectively. The first autonomous driving ECU 60 and the second autonomous driving ECU 70 are ECUs capable of executing autonomous driving control that partially or substantially completely controls the traveling of the vehicle.

The first autonomous driving ECU 60 has a partially autonomous driving function that partially substitutes for the driving operation of the driver. The second autonomous driving ECU 70 has an autonomous driving function capable of substituting for a driver's driving operation. For example, the first autonomous driving ECU 60 enables partial automated driving control (advanced driving assistance) of the level 2 or lower in the autonomous driving level specified by US Society of Automotive Engineers. That is, the first autonomous driving ECU 60 enables the autonomous driving control that requires the driver to monitor the surroundings. In other words, the first autonomous operation ECU 60 enables autonomous driving operation in which the second task described later is prohibited.

For example, the first autonomous driving ECU 60 can execute one or both of the longitudinal control and the lateral control of the vehicle. Here, the longitudinal direction is a direction that coincides with the front-rear direction of the vehicle, and the lateral direction is a direction that coincides with the width direction of the vehicle. The first autonomous driving ECU 60 executes vehicle acceleration/deceleration control as longitudinal direction control, and executes steering angle control of the steered wheels of the vehicle as lateral direction control.

The first autonomous driving ECU 60 establishes a plurality of functional units that realize the above-mentioned advanced driving support by causing the processor 62 to execute a plurality of instructions according to the driving support program stored in the memory 61.

The first autonomous driving ECU 60 recognizes a traveling environment around the vehicle based on the detection information acquired from the periphery monitoring sensor 40. As an example, the first autonomous driving ECU 60 generates information (lane information) indicating the relative position and shape of the left and right lane markings or roadsides of the lane in which the vehicle is currently traveling (hereinafter referred to as the current lane) as the analyzed detection information. In addition, the first autonomous riving ECU 60 generates information (preceding vehicle information) indicating the presence or absence of a preceding vehicle in the current lane and the position and speed of the preceding vehicle when there is a preceding vehicle as the analyzed detection information. The first autonomous driving ECU 60 may be configured to recognize an MD area, an AD area, an ST section, and a non-ST section, which will be described later.

Based on the preceding vehicle information, the first autonomous driving ECU 60 executes ACC (Adaptive Cruise Control) control that realizes constant speed traveling of the vehicle at a target speed or traveling following the preceding vehicle. The first autonomous driving ECU 60 executes LTA (Lane Tracing Assist) control for maintaining the vehicle in the lane based on the lane information. Specifically, the first autonomous driving ECU 60 generates a control command for acceleration/deceleration or steering angle, and sequentially provides them to the vehicle control ECU 80 described later. The ACC control is an example of longitudinal control, and the LTA control is an example of lateral control.

The first autonomous driving ECU 60 realizes level 2 autonomous driving operation by executing both the ACC control and the LTA control. The first autonomous driving ECU 60 may be capable of realizing level 1 autonomous driving operation by executing either the ACC control or the LTA control.

On the other hand, the second autonomous driving ECU 70 enables autonomous driving control of level 3 or higher in the above-mentioned autonomous driving level. That is, the second autonomous driving ECU 70 enables the autonomous driving operation in which the driver is allowed to interrupt the peripheral monitoring. In other words, the second autonomous driving ECU 70 makes it possible to perform automated driving in which the second task is permitted.

Here, the second task is an action other than a driving operation permitted to the driver, and is a predetermined specific action. In the automatic driving period in which the vehicle is automatically driven by the level 3 autonomous driving function of the second autonomous driving ECU 70, the driver in this case is a person (an occupant) who will take over the control right of the driving operation from the autonomous driving system when leaving the restriction area or in an emergency case. The driver may be legally permitted to perform a second task until a request to perform a driving operation by the autonomous driving system, that is a request to switch the driving operation (i.e., Take Over Request), is made.

The second task may be referred to as a secondary activity, another activity, or the like. The second task must not prevent the driver from responding to the request to take over the driving operation from the autonomous driving system. As second tasks, for example, actions such as watching contents such as moving images (watching movies, watching TV), operating smartphones, reading books, and eating are assumed.

The second autonomous driving ECU 70 establishes a plurality of functional units that realize the above-mentioned autonomous driving support by causing the processor 72 to execute a plurality of instructions according to the autonomous driving program stored in the memory 71.

The second autonomous driving ECU 70 recognizes the driving environment around the vehicle based on the vehicle position and map data obtained from the locator ECU 34, the detection information obtained from the periphery monitoring sensor 40, the communication information (such as traffic congestion information) obtained from the in-vehicle communication device 50, and the like. For example, the second autonomous driving ECU 70 recognizes the position of the current lane of the vehicle, the shape of the current lane, the relative positions and relative velocities of moving bodies around the vehicle, traffic congestion, and the like.

In addition, the second autonomous driving ECU 70 identifies the manual driving area (i.e., MD area) and the autonomous driving area (i.e., AD area) in the traveling area of the vehicle, identifies the ST section and the non-ST section in the AD area, and sequentially outputs the recognition result to the HCU 160.

The MD area is an area where autonomous driving is prohibited. In other words, the MD area is an area where the driver performs all of the longitudinal control, lateral control and peripheral monitoring of the vehicle. For example, the MD area is an area where the travel path is a general road.

The AD area is an area where autonomous driving is permitted. In other words, the AD area is an area in which the system of the vehicle can substitute one or more of the longitudinal control, the lateral control and the peripheral monitoring. For example, the AD area is an area where the travelling path is a highway or a motorway.

The AD area is divided into a non-ST section capable of autonomous driving at level 2 or lower and an ST section capable of autonomous driving at level 3 or higher. In the present embodiment, it is assumed that the non-ST section where the level 1 autonomous driving operation is permitted and the non-ST section where the level 2 autonomous driving operation is permitted are equivalent.

The ST section is, for example, a traveling section (i.e., a traffic jam section) in which traffic jam occurs. Further, the ST section is, for example, a traveling section in which a high-precision map is prepared. The HCU 160 determines that the vehicle is in the ST section when the travelling speed of the vehicle remains within the threshold (i.e, the second threshold) range for a predetermined period of time. Alternatively, the HCU 160 may determine whether or not the vehicle is in the ST section using the position of the vehicle and traffic information obtained from the in-vehicle communication device 50 via the DCM. Furthermore, in addition to the traveling speed of the vehicle (or the congestion traffic section condition), the HCU 160 may determine whether or not the vehicle is in the ST section according to a condition (corresponding to the third information in the present embodiments) such that the traveling road has two or more lanes, there is an other vehicle around the subject vehicle (e.g., in the same lane and adjacent lanes), the traveling road has a median strip, or the map DB has high-precision map data.

In addition to the traffic congestion section, the HCU 160 may also detect, as the ST section, a section where a specific condition (corresponding to the fourth information of the present embodiments) other than traffic congestion is established regarding the periphery environment of the vehicle (that is, for example, a section where the vehicle can drive at a constant speed, follow up a preceding vehicle, or drive with LTA (i.e., lane keep driving) without traffic congestion on a highway).

With the autonomous driving system including the above first and second autonomous driving ECUs 60 and 70, at least level 2 and level 3 equivalent autonomous driving can be executed in the vehicle. In the following, the state in which the autonomous driving operation equivalent to level 2 is being executed may be referred to as "level 2 execution mode", and the state in which the autonomous driving operation equivalent to level 3 is being executed may be referred to as "level 3 execution mode".

The vehicle control ECU 80 is an electronic control device that performs acceleration and deceleration control and steering control of the vehicle. The vehicle control ECU 80 includes a steering ECU that performs steering control, a power unit control ECU and a brake ECU that perform acceleration and deceleration control, and the like. The vehicle control ECU 80 acquires detection signals output from respective sensors such as the steering angle sensor, the vehicle speed sensor, and the like mounted on the subject vehicle, and outputs a control signal to an electronic control throttle, a brake actuator, an EPS (Electronic Power Steering) motor, and the like. The vehicle control ECU 80 controls each driving control device so as to realize autonomous driving according to the control instruction by acquiring the control instruction of the vehicle from the first autonomous driving ECU 60 or the second autonomous driving ECU 70.

Further, the vehicle control ECU 80 is connected to an in-vehicle sensor 81 that detects driving operation information of a driving element by a driver. The in-vehicle sensor 81 includes, for example, a pedal sensor that detects the amount of depression of the accelerator pedal, a steering sensor that detects the amount of steering of the steering wheel, and the like. In addition, the in-vehicle sensor 81 includes a vehicle speed sensor that detects the traveling speed of the vehicle, a rotation sensor that detects the operating rotation speed of the traveling drive unit (i.e., an engine, a traveling motor, and the like), a shift sensor that detects the shift position of the transmission, and the like. The vehicle control ECU 80 sequentially provides the detected driving operation information, vehicle operation information, and the like to the HCU 160.

Next, the configurations of the traffic congestion determination device 100 and the display control device 101 will be described. The traffic congestion determination device 100 includes an in-vehicle communication device 50 and an in-vehicle sensor 81 as an acquisition unit, and an HCU 160 as a control unit. The display control apparatus 101 also includes a plurality of display devices as display units, an in-vehicle communication device 50 and an in-vehicle sensor 81 as an acquisition unit, and an HCU 160 as a display control unit. In addition, each device 100, 101 is provided with an audio device 140, an operation device 150, and the like.

The plurality of display devices include a head-up display (hereinafter, HUD) 110, a meter display 120, a center information display (hereinafter, CID) 130, and the like. The plurality of display devices may further include respective displays EMB (for rear view), EML (for left view), EMR (for right view) of the electronic mirror system. The HUD 110, the meter display 120, and the CID 130 are display devices that present image contents such as still images or moving images to the driver as visual information.

In this embodiment, the meter display 120 will be described as a main display unit (i.e., a display unit), and the CID 130 as a sub display unit.

The HUD 110 projects the light of the image formed in front of the driver onto the projection area defined by the front windshield of the vehicle or the like based on the control signal and the video data acquired from the HCU 160. The light of the image that has been reflected toward the vehicle interior by the front windshield is perceived by the driver seated in the driver's seat. In this way, the HUD 110 displays a virtual image in the space in front of the projection area. The driver visually recognizes the virtual image in the angle of view displayed by the HUD 110 so as to overlap the foreground of the vehicle.

The meter display 120 and the CID 130 mainly include, for example, a liquid crystal display or an OLED (Organic Light Emitting Diode) display. The meter display 120 and the CID 130 display various images on the display screen based on the control signal and the video data acquired from the HCU 160. The meter display 120 is installed, for example, in front of the driver's seat. The CID 130 is provided in the central region in the vehicle width direction in front of the driver. For example, the CID 130 is installed above the center cluster in the instrument panel. The CID 130 has a touch panel function, and detects, for example, a touch operation and a swipe operation on the display screen by a driver or the like.

The audio device 140 has a plurality of speakers installed in the vehicle interior. The audio device 140 presents a notification sound, a voice message, or the like as auditory information to the driver based on the control signal and voice data acquired from the HCU 160. That is, the audio device 140 is an information presentation device capable of presenting information in a mode different from visual information.

The operation device 150 is an input unit that receives a user operation by a driver or the like. For example, user operations related to the start and stop of each level of the autonomous driving function are input to the operation device 150. The operation device 150 includes, for example, a steering switch provided on the spoke portion of the steering wheel, an operation lever provided on the steering column portion, a voice input device for recognizing the contents of the driver's speech, and an icon for touch operation on the CID 130 (switch), and the like.

The HCU 160 controls the determination of the occurrence of traffic congestion and the information presentation to the driver (i.e, display on a display device) based on information from the in-vehicle communication device 50, the vehicle control ECU 80 (i.e., the first autonomous driving ECU 60 and the second autonomous driving ECU 70), and the like. The HCU 160 mainly includes a computer including a processor 162, a memory 161, an input/output interface, a bus connecting these components, and the like.

The memory 161 is at least one type of non-transitory tangible storage medium, such as a semiconductor memory, a magnetic storage medium, and an optical storage medium, for non-transitory storing or memorizing computer readable programs and data. The memory 161 stores various programs executed by the processor 162, such as a presentation control program described later.

The processor 162 is a hardware for arithmetic processing. The processor 162 includes, as a core, at least one type of, for example, a CPU (Central Processing Unit), a GPU (Graphics Processing Unit), an RISC (Reduced Instruction Set Computer) CPU, and so on.

The processor 162 executes a plurality of instructions included in the presentation control program stored in the memory 161. As a result, the HCU 160 provides a plurality of functional units for controlling the presentation to the driver. As described above, in the HCU 160, the presentation control program stored in the memory 161 causes the processor 162 to execute a plurality of instructions, thereby constructing a plurality of functional units.

The HCU 160 acquires the driving environment recognition result from the first autonomous driving ECU 60 or the second autonomous driving ECU 70. The HCU 160 grasps the periphery state of the vehicle based on the acquired recognition result. Specifically, the HCU 160 grasps the approach to the AD area, the entry into the AD area, the approach to the ST section (i.e., the congested section), the entry into the ST section, and the like. The HCU 160 may grasp the periphery state based on information directly obtained from the locator ECU 34, the periphery monitoring sensor 40, or the like instead of the recognition results obtained from the first and second autonomous driving ECUs 60 and 70.

The HCU 160 integrates a determination (i.e., congestion determination by executing the first algorithm) of the occurrence of traffic congestion based on the VICS information obtained by the in-vehicle communication device 50 and a determination (i.e., congestion determination by executing the second algorithm) of the occurrence of traffic congestion based on the DCM information from the in-vehicle communication device 50 and the vehicle speed information from the in-vehicle sensor 81 (i.e, the vehicle speed sensor), so that the HCU 160 grasps the situation in the ST section (i.e., the congestion section).

The HCU 160 estimates the driver state based on information from the DSM 20, the vehicle control ECU 80, and the like. For example, the HCU 160 estimates whether or not each body part of the driver is involved in the driving motion as the driver state. Specifically, the HCU 160 determines whether or not the driver's eye portion is performing peripheral monitoring based on the state information regarding the driver's line-of-sight direction acquired from the DSM 20. Also, the HCU 160 determines whether or not the driver is gripping the steering wheel by hand based on the steering amount acquired from vehicle control ECU 80. Further, the HCU 160 determines whether or not the driver puts his or her foot on the accelerator pedal based on the depression amount of the accelerator pedal acquired from the vehicle control ECU 80.

Further, the HCU 160 determines whether or not the driver is sleeping, looking aside, or having an illness based on the driver status information obtained from the DSM 20.

In the following, the state in which the eye portion is monitoring the periphery may be referred to as an eye's on state, and the state in which the eye portion is not monitoring the periphery may be referred to as an eye's off state. Further, the state in which the steering wheel is gripped by hand may be referred to as a hands-on state, and the state in which the steering wheel is not gripped by hand may be referred to as a hands-off state. In addition, the state in which the foot is placed on the accelerator pedal may be referred to as a leg-on state, and the state in which the foot is not placed on the accelerator pedal may be referred to as a leg-off state.

The HCU 160 determines the driving state related to autonomous driving operation in cooperation with the first autonomous driving ECU 60 and the second autonomous driving ECU 70. Specifically, the HCU 160 determines the autonomous driving operation level permitted to the driver and the autonomous driving operation level actually executed as the drive state.

The HCU 160 determines that the autonomous driving operation is not allowable when the vehicle is traveling in the MD area. On the other hand, the HCU 160 determines that the autonomous driving operation with level 2 or higher is allowable when the vehicle is traveling in the AD area. Further, the HCU 160 determines that level 2 autonomous driving can be permitted when traveling in a non-ST section of the AD area, and determines that the level 3 autonomous driving can be permitted when traveling in an ST section.

In the following, a state in which the level 2 autonomous driving is permitted may be referred to as a "level 2 permission state", and a state in which level 3 autonomous driving is permitted may be referred to as a "level 3 permission state". In addition, a state in which autonomous driving itself is prohibited may be referred to as an "autonomous driving prohibition state".

In addition, when the HCU 160 determines that the autonomous driving of the level 2 is permitted, the drive state determination unit 120 determines whether or not the hands-off is permitted at the level 2. Specifically, when the HCU 160 determines that the specific condition is satisfied based on the execution state of the LTA, the presence/absence of high-precision map data around the vehicle, the lane state, the driver's peripheral monitoring state, the road shape around the vehicle, and the like, the drive state determination unit 120 determines that the hands-off is permitted.

The specific condition includes, for example, at least one of: the LTA control being executed; the presence of the high-precision map data around vehicle; at least one of the left and right lane markings of the current lane being detectable; the execution of the driver monitoring of the surroundings being determined; and the traveling section not a complicated section of the road structure (for example, a merge section or a fork section). In the following, the state in which the hands-off is permitted may be referred to as "a hands-off permission state", and the state in which the hands-off is prohibited may be referred to as "a hands-off prohibition state".

Further, the HCU 160 permits leg-off when at least ACC is executed in the autonomous driving operation of level 2 or lower. In the following, the state in which the leg-off is permitted may be referred to as "a leg-off permission state", and the state in which the leg-off is prohibited may be referred to as "a leg-off prohibition state". In addition, the HCU 160 permits eyes-off when level 3 autonomous driving operation is allowable. That is, it can be said that the level 3 permission state is the eyes-off permission state.

The HCU 160 determines the level of autonomous driving operation to be actually executed based on the periphery condition of the vehicle, the status of the driver, the level of autonomous driving operation currently permitted, input information to the operation device 150, and the like. That is, the HCU 160 determines execution of the level of autonomous driving operation when an instruction to start the currently permitted level of autonomous driving operation is acquired as input information.

The HCU 160 controls presentation of content related to autonomous driving. Specifically, the HCU 160 selects a content to be presented on each display device 110, 120, 130 based on various information.

The HCU 160 arbitrates the content to be displayed on each display device 110, 120, 130. The HCU 160 comprehensively determines the priority of each content based on various information. The HCU 160 selects content determined to have a high priority as content to be presented. In addition, the HCU 160 can sequentially change the display size and display layout of each content to be displayed on each display device 110, 120, 130 according to priority. As an example, the HCU 160 increases the display size of content with higher priority. As another example, the HCU 160 positions higher priority content closer to the front of each display area.

The HCU 160 generates a control signal and video data to be provided to each display device 110, 120, 130 and a control signal and audio data to be provided to audio device 140. The HCU 160 outputs the generated control signal and each data to each presentation device, thereby presenting information on each of the display devices 110, 120, and 130.

The configurations of the traffic congestion determination device 100 and the display control device 101 are as described above, and the operation and effects will be described below with reference to FIGS. 2 to 10.

In this embodiment, mainly, in highway driving, the determination of the presence or absence of traffic congestion occurrence and the point of presenting information to the driver for switching to autonomous driving level 3 (i.e., driver's periphery monitoring unnecessary) when traffic congestion occurs are control targets.

Figure 2:
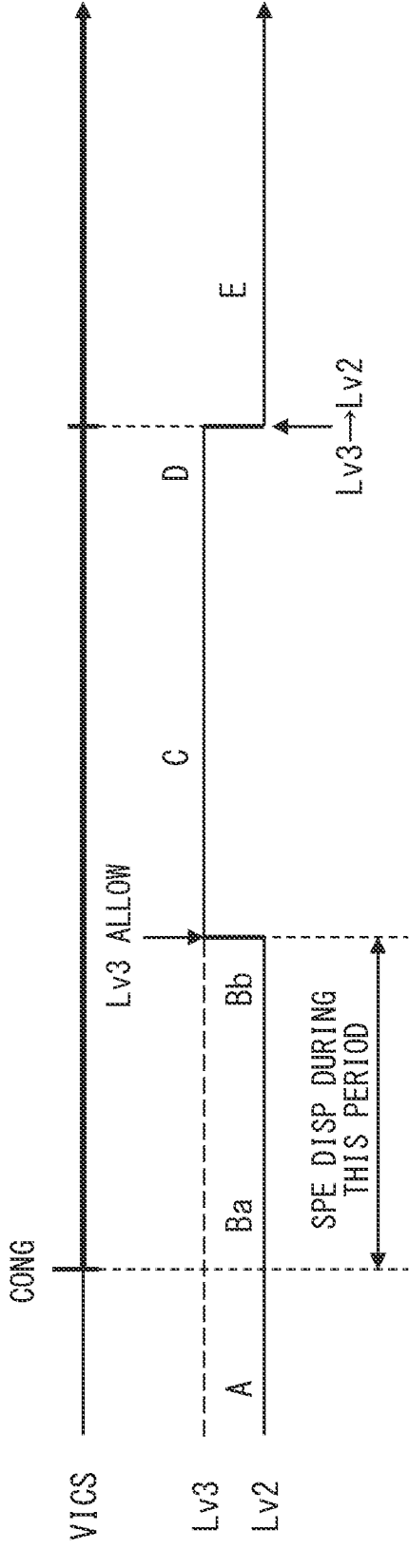
FIG. 2 is an explanatory diagram showing congestion information by VICS and possible levels of autonomous driving (e.g., level 2 and level 3)

FIG. 2 shows traffic congestion information from the VICS when driving on a highway (a thick line in the drawing indicate an area where the traffic congestion occurs), a section where the autonomous driving level 2 is allowable and a section where the autonomous driving level 3 is allowable according to the traffic congestion information from vehicle speed sensor and the DCM. The letters in FIG. 2 indicate travelling positions A, Ba, Bb, C, D, and E in order over time.

The HCU 160 acquires VICS information from the in-vehicle communication device 50 and determines whether or not there is a traffic congestion toward the travelling destination (i.e., the front side of the vehicle) (by executing the first algorithm). That is, the HCU 160 determines, based on the VICS information, that the traffic congestion occurs (i.e., the first information) when the vehicle speed (i.e., the travelling speed) of another vehicle travelling in front of the subject vehicle on the highway falls below a predetermined first threshold value (e.g., 40 km/h). From this traffic congestion information, the HCU 160 can grasp the origin point and the end point of the traffic congestion toward the travelling direction.

The HCU 160 also acquires information from the vehicle speed sensor and the DCM via the in-vehicle sensor 81 and the in-vehicle communication device 50, and determines whether or not there is traffic congestion toward the travelling direction (i.e., the front side of the vehicle) (by executing the second algorithm). That is, the HCU 160 determines, based on the information from the vehicle speed sensor and the DCM, that the traffic congestion occurs (i.e., the second information) when the vehicle speed (i.e., the travelling speed) of the subject vehicle or the vehicle speed of another vehicle travelling in front of the subject vehicle on the highway falls below a predetermined second threshold value (e.g., 10 km/h). The occurrence of traffic congestion corresponding to the second information indicates an area in which the autonomous driving level 3 is permitted (enabled) during traffic congestion on a highway.

The HCU 160 integrates the first information indicating the occurrence of traffic congestion and the second information, grasps the occurrence situation of traffic congestion, and presents information to the driver (i.e., displays on the display unit) as described below.

Figures 4, 5:
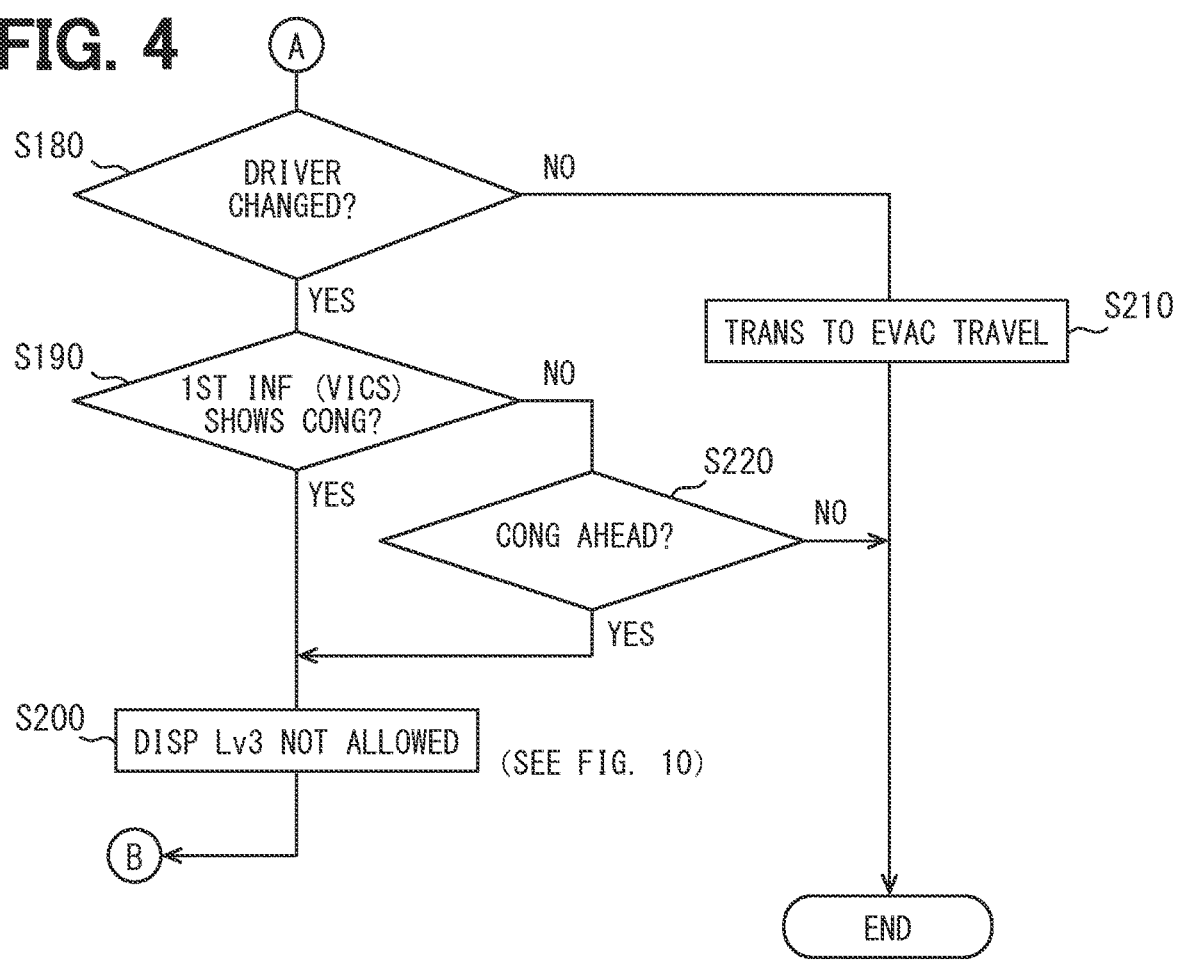
FIG. 4 is a flowchart (of a second half) showing the procedure of display control performed by the HCU of the first embodiment.
FIG. 5 is an explanatory diagram showing a display state at a travel position A in FIG. 2.

The HCU 160 controls the display state of the display unit. Here, the display unit is described as using the meter display 120. As shown in FIG. 5, the HCU 160 displays, for example, the vehicle speed value (e.g., 80 km/h in FIG. 5) in the upper center of the meter display 120, the lanes (here, two lanes) below the vehicle speed value, and the subject vehicle and the preceding vehicle in the lanes in real time. In addition, as will be described below, the HCU 160 provides information to be presented to the driver (such as "There is traffic congestion ahead" in FIG. 5) by displaying the information in an area that does not obstruct the display of the vehicle speed value, the subject vehicle and the preceding vehicle.

Figure 3:
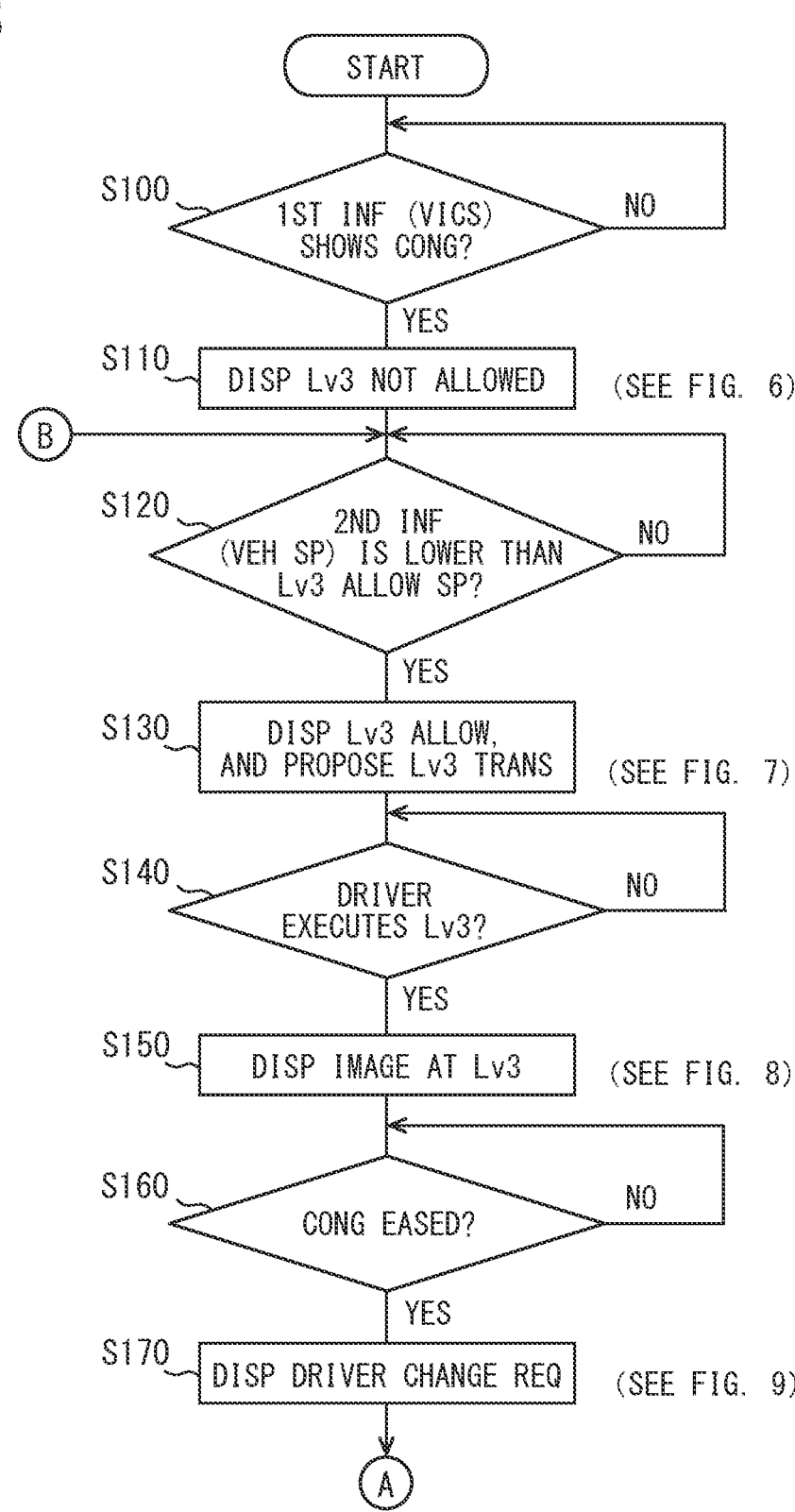
FIG. 3 is a flowchart (of a first half) showing the procedure of display control performed by the HCU of the first embodiment.

Hereinafter, the display form (i.e., information presentation) on the meter display 120 according to the occurrence of traffic congestion will be described along the flow charts of FIGS. 3 and 4.

(1) Display at Travel Position A (FIGS. 2 and 5)

For example, the vehicle is traveling on a highway at 80 km/h, and the meter display 120 displays the vehicle speed value and images of the subject vehicle and the preceding vehicle. When the HCU 160 obtains traffic congestion information from the VICS, it displays, for example, "There is traffic congestion ahead" on the meter display 120 to notify the driver of the traffic congestion. At this time, the autonomous driving level is level 2.

Figure 6:
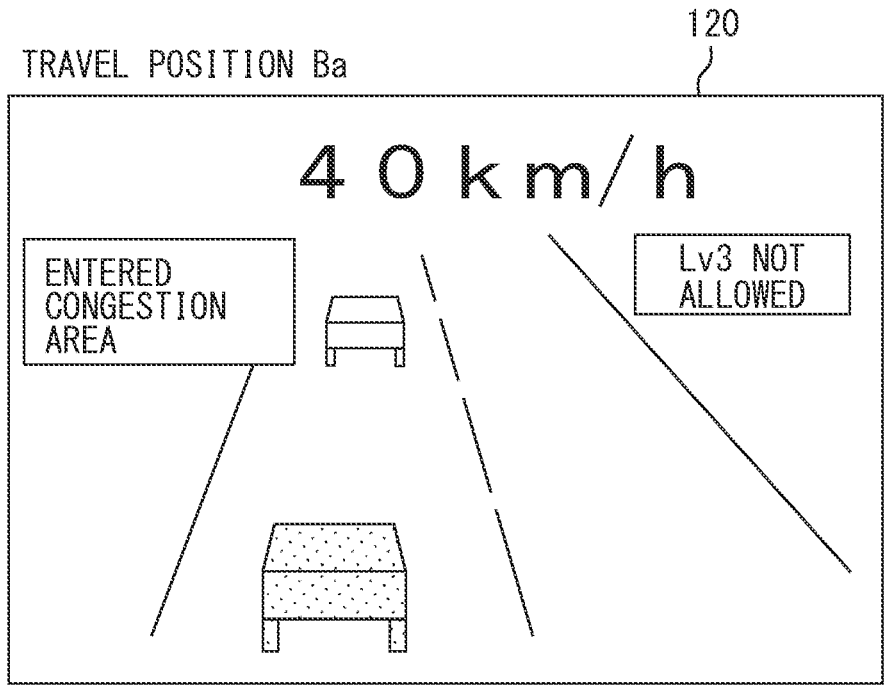
FIG. 6 is an explanatory diagram showing a display state at a travel position Ba in FIG. 2.

(2) Display at Travel Position Ba (FIGS. 2 and 6)

In step S100, when the vehicle enters a congestion section based on the VICS and the vehicle speed based on the vehicle speed sensor decreases, the HCU 160 changes the vehicle speed value displayed on meter display 120 (for example, about 40 km/h), and further displays (i.e., informs the driver) that "the vehicle has entered a congestion area". However, at this stage, the vehicle speed is the driving speed (e.g., 40 km/h) that indicates the traffic congestion in the VICS, and does not satisfy the vehicle speed condition (for example, the condition of the speed less than 10 km/h) that permits the autonomous driving level 3 in the traffic congestion. Therefore, the autonomous driving level 2 is maintained as the autonomous driving operation level.

At this time, in step S110, the HCU 160 also displays on the meter display 120, "Transition to autonomous driving level 3 is not allowable" so that the driver does not feel uncomfortable. The sense of incongruity of the driver is that although the VICS information indicates that the vehicle is in a congestion section, the autonomous driving level during the congested traffic has not shifted to level 3. The congestion occurrence information may be obtained by an in-vehicle sensor 81 such as a sensor or a camera, instead of being based on VICS.

Figure 7:
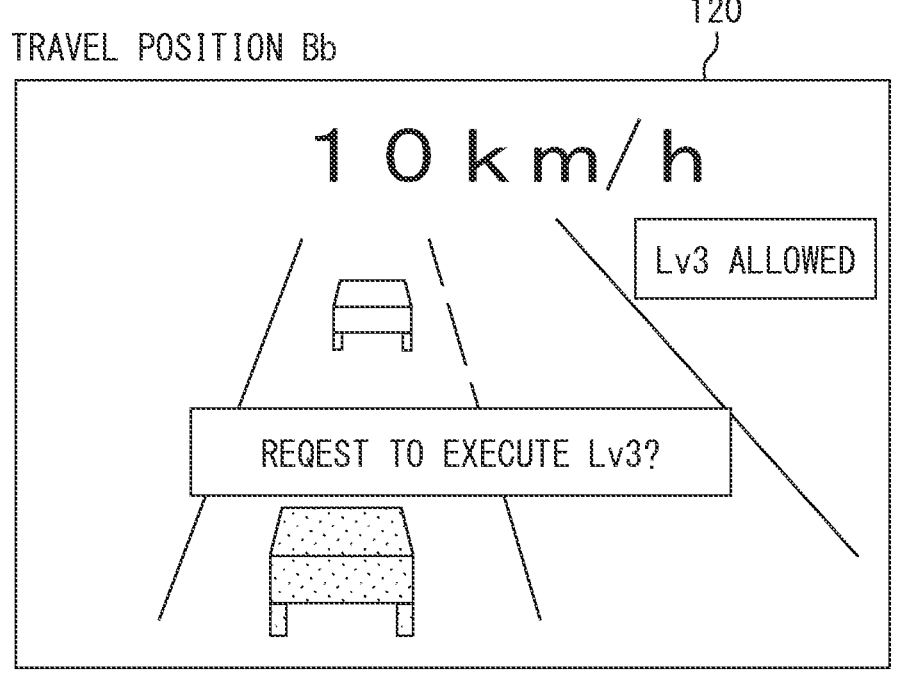
FIG. 7 is an explanatory diagram showing a display state at a travel position Bb in FIG. 2.

(3) Display at Travel Position Bb (FIGS. 2 and 7)

Next, in step S120, when the vehicle enters a congestion section based on the VICS and the vehicle speed based on the vehicle speed sensor is reduced, the HCU 160 changes the vehicle speed value displayed on the meter display 120 (for example, 10 km/h). When the vehicle speed at this time falls below the predetermined vehicle speed that permits the shift to autonomous driving level 3 (as second information), in step S130, the HCU 160 controls the meter display 120 to display "Transition to autonomous driving level 3 allowable", and further display the message "Do you request to execute the autonomous driving level 3?" (as a transition proposal).

Based on this, the driver performs an input operation on the operation device 150 (such as a steering switch, an operation lever, and the like) to execute the autonomous driving level 3 during the traffic congestion (i.e., the main operator of driving is shifted from the driver to the autonomous driving system).

In addition to the display format as described above, the HCU 160 may display "Transition to autonomous driving level 3 is not allowable" on the meter display 120 while the condition for shifting to the autonomous driving level 3 is not satisfied. Then, when the condition for shifting to the autonomous driving level 3 is satisfied, the HCU 160 may display "Transition to autonomous driving level 3 is allowable", and when the driver performs an input operation on the operation device 150 for transition, the autonomous driving operation with level 3 may be executed.

Figure 8:
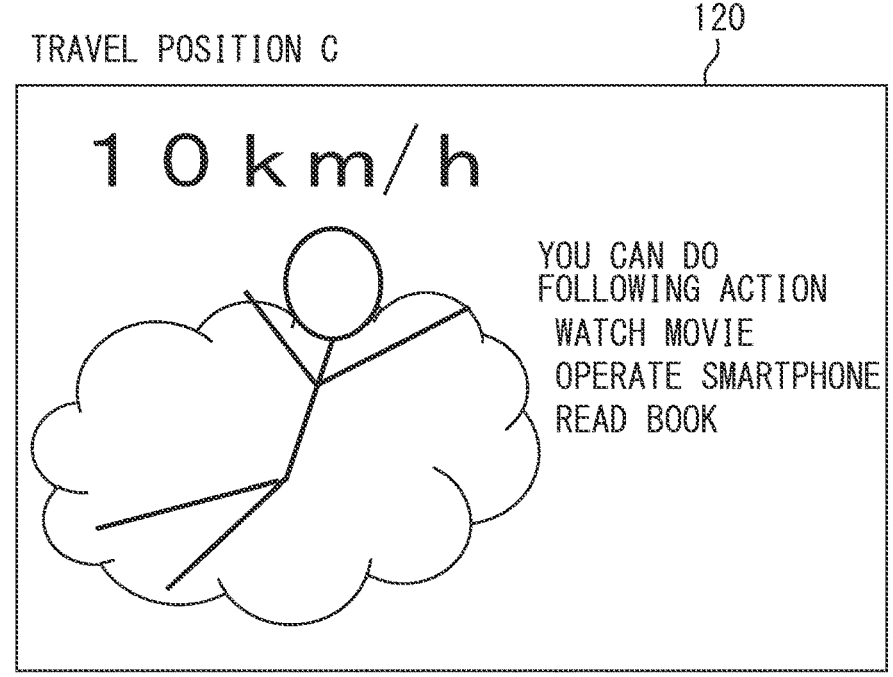
FIG. 8 is an explanatory diagram showing a display state at a travel position C in FIG. 2.

(4) Display at Travel Position C (FIGS. 2 and 8)

Next, when the operation is transitioned to the autonomous driving level 3 in step S140, the HCU 160 displays an image corresponding to the autonomous driving level 3 on the meter display 120 in step S150. The HCU 160 displays, for example, an image of a relaxed person, and also displays a second task allowed for the driver while autonomous driving level 3 is being executed. The second tasks are, for example, watching movies, watching television, operating smartphones, reading books, and the like.

Figure 9:
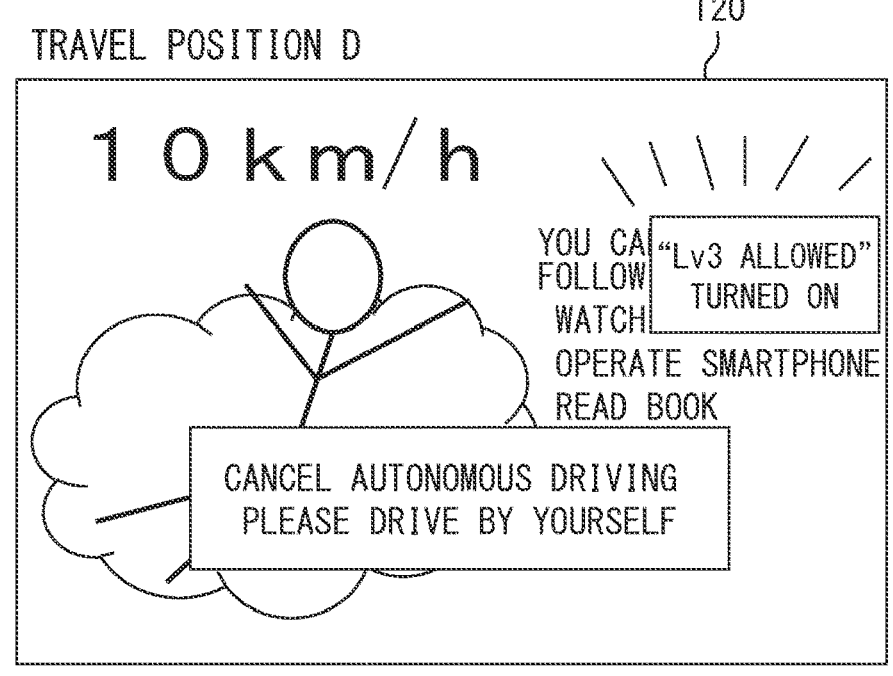
FIG. 9 is an explanatory diagram showing a display state at a travel position D in FIG. 2.

(5) Display at Travel Position D (FIGS. 2 and 9)

Next, in step S160, when the vehicle speed values of the subject vehicle and the preceding vehicle are increasing based on information from the vehicle speed sensor and the DCM, and the traffic congestion is being reduced, the HCU 160 blinks the display "Autonomous driving level 3 is available" to indicate that the vehicle will soon leave the section where the autonomous driving level 3 is allowable due to traffic congestion. In addition, the HCU 160 displays "Autonomous driving operation will be canceled. Please take over the driving", and shifts from the autonomous driving mode to the driver driving mode. When the driver performs an input operation for shifting to the operation device 150, the autonomous driving level is shifted to level 2.

Figure 10:
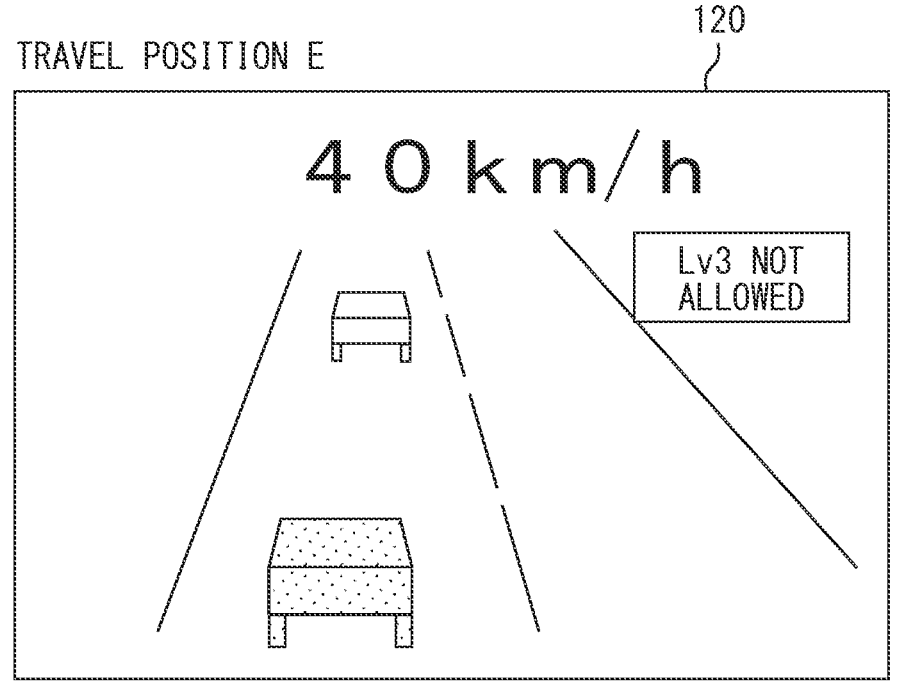
FIG. 10 is an explanatory diagram showing a display state at a travel position E in FIG. 2.

(6) Display at Travel Position E (FIGS. 2 and 10)

Next, at step S180, when shifting to the autonomous driving level 2, even if the information from the VICS shows "traffic congestion" (i.e., even if the traffic congestion has not ended) at step S190, the HCU 160 displays the vehicle speed value, images of the subject vehicle and the preceding vehicle, and displays "autonomous driving level 3 not allowable" on the meter display 120 at step S200. After step S200, the process returns to step S120.

On the other hand, when a negative determination is made in step S180 (i.e., the driver has not changed driving), in step S210 the HCU 160 shifts to an evacuation travel operation and ends this control flow. When the driver does not change driving, for example, the driver may be asleep or suddenly ill, and the HCU 160 safely stops the vehicle on the shoulder of the road or the like as the evacuation travel operation.

Further, when a negative determination is made in step S190 (i.e., the information by the VICS shows "no traffic congestion"), and then, in step S220, if "traffic congestion occurs" again, the process proceeds to step S200, and the HCU 160 continues to display "Autonomous driving level 3 not allowable". When a negative determination is made in step S220, the HCU 160 ends this control flow.

As described above, in the present embodiment, the congestion determination device 100 and the HCU 160 of the display control device 101 combine the first information (i.e., the congestion information obtained from the VICS) acquired by the in-vehicle communication device 50 and the second information (i.e., the congestion information obtained from the DCM or the vehicle speed sensor) acquired by the in-vehicle communication device 50 and the in-vehicle sensor 81 to determine the occurrence of traffic congestion by the first algorithm and to determine the occurrence of traffic congestion by the second algorithm. As a result, it is possible to accurately determine the occurrence of traffic congestion.

Also, the HCU 160 determines whether or not to display on meter display (i.e., the display unit) 120 that the autonomous driving operation is not allowable, based on the result of the first algorithm and the result of the second algorithm. As a result, it is possible to clearly present to the driver that the autonomous driving operation is not allowable.

Further, the HCU 160 displays that the autonomous driving operation is not allowable when the first threshold is satisfied by the first algorithm and the second threshold is not satisfied by the second algorithm. Thus, even if the first information shows that the traffic congestion occurs, the HCU 160 displays on the display unit 120 that the autonomous driving operation is not allowable unless the second information does not satisfy the second threshold. Thus, it is possible to clearly inform the user that the transition to the autonomous driving operation is not yet allowable. In other words, the transition to the autonomous driving operation can be conveyed to the user in an easy-to-understand manner.

Moreover, after the HCU 160 ends the autonomous driving operation, if the occurrence of traffic congestion based on the first information has not ended, the HCU 160 displays that the autonomous driving operation is not allowable. As a result, the display for the driver is not frequently switched between "autonomous driving operation allowable" and "autonomous driving operation not allowable", and therefore, the driver is not annoyed.

In addition, even if there is no traffic congestion based on the first information, the HCU 160 continues to display that the autonomous driving operation is not allowable when the traffic congestion occurs again based on the first information. As a result, similar to the above feature, the display for the driver is not frequently switched between "autonomous driving operation allowable" and "autonomous driving operation not allowable", and therefore, the driver is not annoyed.

Second Embodiment

Figure 11:
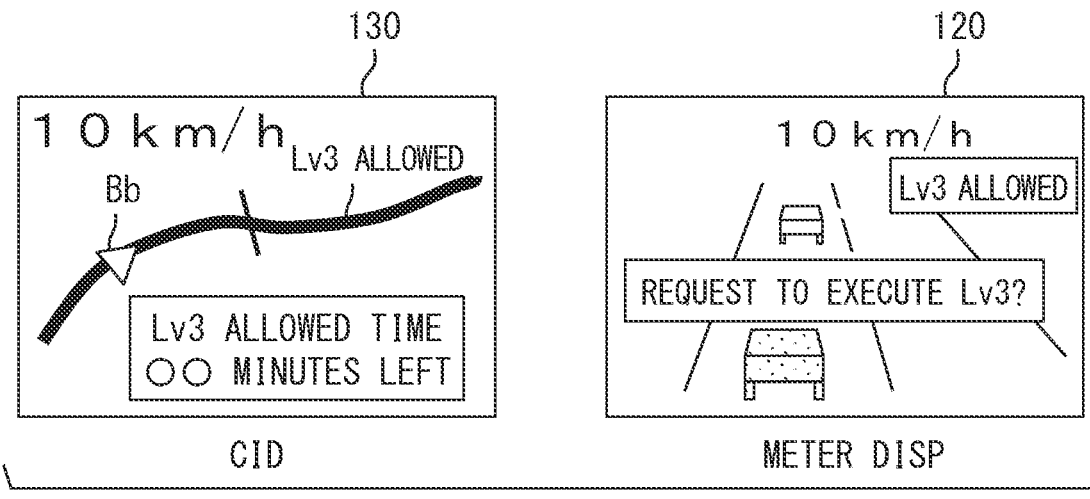
FIG. 11 is an explanatory diagram for explaining a display state (as an example) in the second embodiment.
Figure 12:
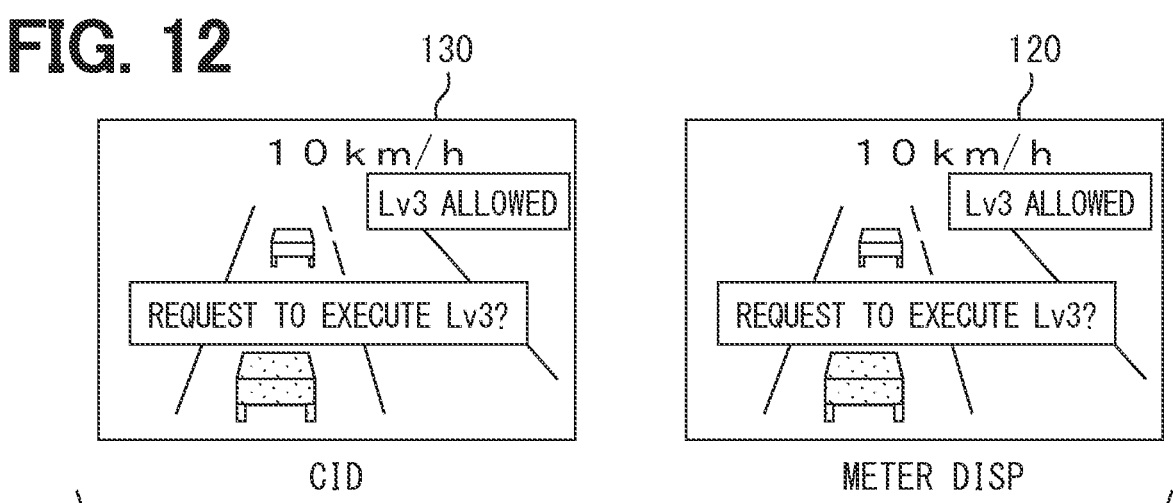
FIG. 12 is an explanatory diagram for explaining a display state (as another example) in the second embodiment.

The display form in the second embodiment is shown in FIGS. 11 and 12. In the second embodiment, during the autonomous driving operation, in addition to the meter display 120, which is the main display, information related to the driving operation is displayed to inform the driver on the CID 130 (or the HUD 110 may be also possible), which is a sub display. FIGS. 11 and 12 show, for example, a state (at driving position Bb) in which the vehicle is traveling on a highway and is about to shift to the autonomous driving level 3 (See FIG. 7 of the first embodiment).

As shown in FIG. 11, for example, at the travel position Bb, the meter display 120 displays the information described in FIG. 7 of the first embodiment. In addition, the CID 130 displays the map data from the locator 30, the highway of the map data on which the vehicle is currently running, and the current position of the subject vehicle, and further, displays the required time to become a state that the transition to the autonomous driving operation is possible. FIG. 11 shows a case where the display contents on the meter display 120 and the display contents on the CID 130 are different.

Here, as shown in FIG. 12, the display contents of the meter display 120 and the CID 130 may be the same.

In this way, during the autonomous driving, by displaying various related information to the driver using a plurality of display units, the driver can reliably grasp the distinction between necessary and unnecessary of monitoring of the periphery accompanying the level of autonomous driving with eliminating omissions in grasping information.

Third Embodiment

In the third embodiment, the condition of the start of autonomous driving operation is changed. The HCU 160 further acquires third information different from the second information (i.e., the vehicle speed value) from the periphery monitoring sensor 40 as an acquisition unit and the locator 30 as a condition for starting autonomous driving. As described above, the third information shows that, for example, the travelling road has two or more lanes, other vehicles are disposed around the subject vehicle (in the same lane or adjacent lanes), the travelling road has the center divider at the center of the road, and a high-precision map data exists.

The HCU 160 displays on the display unit that the autonomous driving operation is allowable, or the autonomous driving operation is started when the first threshold (relating to the congestion information by the VICS) and the second threshold (relating to the vehicle speed value by the vehicle speed sensor) are satisfied, and the third information is also satisfied. As a result, it is possible to improve the reliability in grasping the occurrence situation of traffic congestion.

Fourth Embodiment

In the fourth embodiment, the condition of the start of autonomous driving operation is changed. The HCU 160 further acquires fourth information, which is a condition for starting autonomous driving in a situation not limited to traffic congestion, from the periphery monitoring sensor 40 as an acquisition unit. As described above, the fourth information is, for example, information indicating a section where a constant-speed running, a follow-up running, or a LTA (i.e., lane-keeping running) is allowable on a highway without traffic congestion.

In the state indicated by the fourth information, the HCU 160 displays on the display unit that the autonomous driving operation is allowable regardless of the first and second information. As a result, the driver can be presented with a wide variety of transitions to autonomous driving, not limited to autonomous driving operation when a traffic congestion occurs.

Other Embodiments

Figure 13:
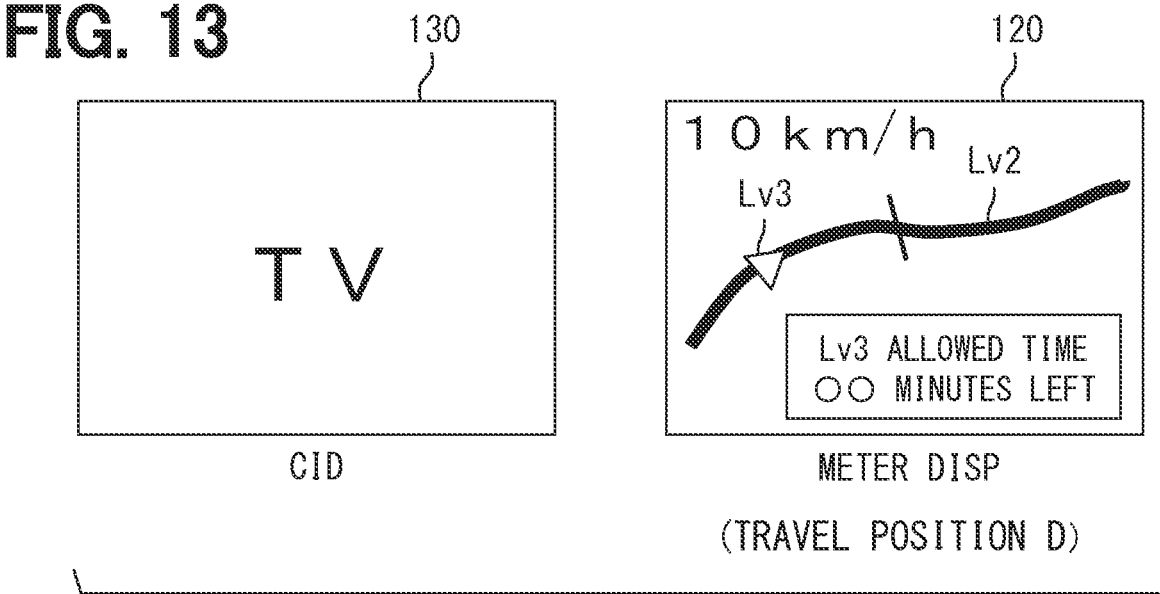
FIG. 13 is an explanatory diagram illustrating a display state (as one example) in another embodiment.
Figure 14:
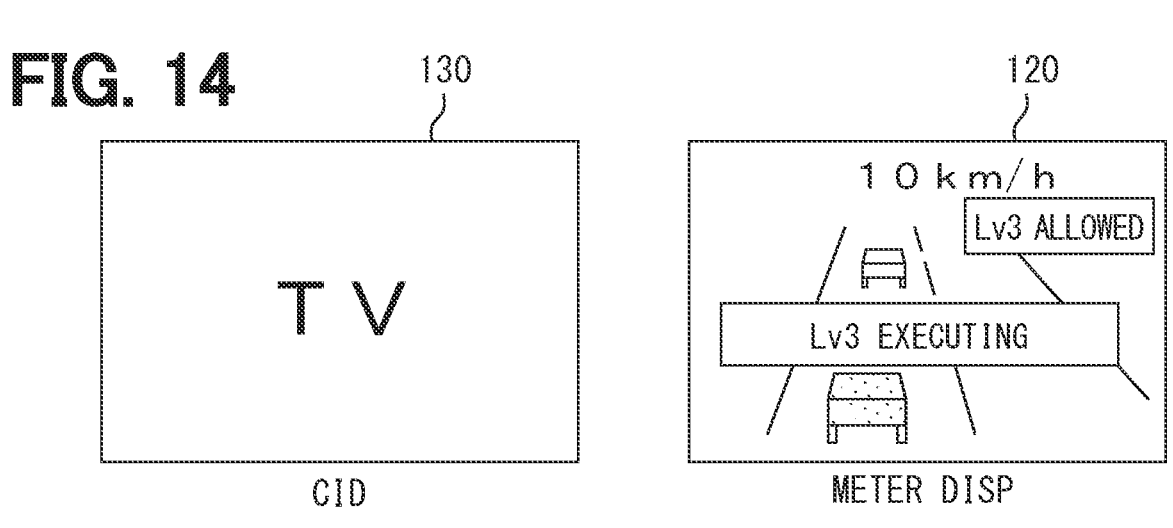
FIG. 14 is an explanatory diagram illustrating a display state (as another example) in another embodiment.

During autonomous operation, as described in the first embodiment (see FIG. 8), the second task is permitted. Thus, TV image or movie image may be displayed on one of a plurality of display devices (such as the CID 130), as shown in FIGS. 13 and 14.

Further, instead of the display of "autonomous driving level 3 not allowable" explained in the first embodiment (in FIGS. 6 and 10), for example, an item of what the driver must do, or what the driver must not do, such as a message of "periphery monitoring required" or "second task impossible" may be displayed.

In addition, instead of the display of "Transition to autonomous driving level 3 is allowable" described in the first embodiment (in FIG. 7), for example, an item of what the driver does not have to do, or what the driver can do, such as a message of "periphery monitoring not required", or "second task possible" may be displayed.

The disclosure in the present disclosure and drawings is not limited to the exemplified embodiments. The present disclosure includes embodiments described above and modifications of the above-described embodiments made by a person skilled in the art. For example, the present disclosure is not limited to a combination of the components and/or elements described in the embodiments. The present disclosure may be executed by various different combinations. The present disclosure may include additional configuration that can be added to the above-described embodiments. The present disclosure also includes modifications which include partial components/elements of the above-described embodiments. The present disclosure includes replacements of components and/or elements between one embodiment and another embodiment, or combinations of components and/or elements between one embodiment and another embodiment The disclosed technical scope is not limited to the description of the embodiment. It should be understood that some disclosed technical ranges are indicated by description of claims, and includes every modification within the equivalent meaning and the scope of description of claims.

The control unit and the techniques thereof according to the present disclosure may be implemented by one or more special-purposed computers. Such a special-purposed computer may be provided by configuring a processor and a memory programmed to execute one or more functions embodied by a computer program.

Alternatively, each control unit and the like, and each method thereof described in the present disclosure may be implemented by a dedicated computer provided by including a processor with one or more dedicated hardware logic circuits.

Alternatively, the control unit and the like and the method thereof described in the present disclosure may be achieved by one or more dedicated computers constituted by a combination of a processor and a memory programmed to execute one or a plurality of functions and a processor constituted by one or more hardware logic circuits.

The computer program may be stored in a computer readable non-transitory tangible storage medium as computer-executable instructions.

The controllers and methods described in the present disclosure may be implemented by a special purpose computer created by configuring a memory and a processor programmed to execute one or more particular functions embodied in computer programs. Alternatively, the controllers and methods described in the present disclosure may be implemented by a special purpose computer created by configuring a processor provided by one or more special purpose hardware logic circuits. Alternatively, the controllers and methods described in the present disclosure may be implemented by one or more special purpose computers created by configuring a combination of a memory and a processor programmed to execute one or more particular functions and a processor provided by one or more hardware logic circuits. The computer programs may be stored, as instructions being executed by a computer, in a tangible non-transitory computer-readable medium.

It is noted that a flowchart or the processing of the flowchart in the present application includes sections (also referred to as steps), each of which is represented, for instance, as S100. Further, each section can be divided into several sub-sections while several sections can be combined into a single section. Furthermore, each of thus configured sections can be also referred to as a device, module, or means.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A vehicle congestion determination device comprising a processor and memory configured to implement:
   an acquisition unit configured to acquire a first information indicating that a traveling speed of an other vehicle in front of a vehicle is smaller than a predetermined first threshold value and a traffic congestion occurs, and a second information indicating that the traffic congestion occurs based on a predetermined second threshold value, which is set to be smaller than the first threshold value, as an allowable condition for starting an autonomous driving operation of the vehicle during the traffic congestion using an autonomous driving function of the vehicle; and
   a control unit configured to integrate the first information and the second information and execute a first algorithm for determining an occurrence of the traffic congestion based on the first threshold value and a second algorithm for determining the occurrence of the traffic congestion based on the second threshold value;
   wherein the control unit:
      determines whether to display on a display the first information and the second information that the autonomous driving operation is not allowable during the traffic congestion, based on a result of the first algorithm and a result of the second algorithm, while stopping the autonomous driving operation during the traffic congestion, and enables the autonomous driving operation based on the result of the first algorithm and the second algorithm indicating the allowable condition for starting the autonomous driving operation;
      displays that the autonomous driving operation is not allowed when the traffic congestion has not ended, according to the first information, after stopping the autonomous driving operation;
      continues to display that the autonomous driving operation is not allowed in response to determining again, according to the first information, that traffic congestion is occurring ahead of the vehicle after previous traffic congestion has ended, according to the first information; and
      stops displaying that the autonomous driving operation is not allowed in response to determining, according to the first information, that the traffic congestion is not occurring ahead of the vehicle after the previous traffic congestion has ended, according to the first information.

2. The vehicle congestion determination device according to claim 1, wherein:
   the control unit displays that the autonomous driving operation is not allowable when the first threshold value is satisfied in the first algorithm and the second threshold value is not satisfied in the second algorithm.

3. The vehicle congestion determination device according to claim 1, wherein:
   the control unit displays information related to driving on a sub-display-unit arranged at a position different from the display-unit in addition to the display-unit.

4. A vehicle display control device comprising
   a display configured to display vehicle information; and
   a processor and memory configured to implement:
      an acquisition unit configured to acquire a first information indicating that a traveling speed of an other vehicle in front of a vehicle is smaller than a predetermined first threshold value and a traffic congestion occurs, and a second information indicating whether an autonomous driving operation of the vehicle is allowable based on a predetermined second threshold value, which is set to be smaller than the first threshold value, as an allowable condition for starting the autonomous driving operation during the traffic congestion using an autonomous driving function of the vehicle; and
      a display control unit configured to display on the display that the autonomous driving operation is not allowable during the traffic congestion when the first threshold value is satisfied in the first information and the second threshold value is not satisfied in the second information, while stopping the autonomous driving operation during the traffic congestion, and configured to enable the autonomous driving operation when the first threshold value is satisfied in the first information and the second threshold value is satisfied in the second information;
   wherein the display control unit:
      displays on the display that the autonomous driving operation is not allowed when the traffic congestion has not ended, according to the first information, after stopping the autonomous driving operation;
      continues to display on the display that the autonomous driving operation is not allowed in response to determining again, according to the first information, that traffic congestion is occurring ahead of the vehicle after previous traffic congestion has ended, according to the first information; and
      stops displaying on the display that the autonomous driving operation is not allowed in response to determining, according to the first information, that the traffic congestion does not occurring ahead of the vehicle after the previous traffic congestion has ended, according to the first information.

5. The vehicle display control device according to claim 4, wherein:
   the acquisition unit further acquires third information different from the second information as an allowable condition for starting the autonomous driving operation; and
   the display control unit displays that the autonomous driving operation is allowable, or the autonomous driving operation is started when the first threshold value is satisfied in the first information, the second threshold value is satisfied in the second information, and the third information shows a satisfaction.

6. The vehicle display control device according to claim 5, wherein:

the acquisition unit further acquires fourth information that is a condition for starting the autonomous driving operation not limited to the traffic congestion; and the display control unit displays that the autonomous driving operation is allowable when the fourth information shows a satisfaction regardless of whether the first information and the second information show the satisfaction or not.

7. A vehicle display control device for controlling a display configured to display vehicle information, the vehicle display control device comprising a processor and memory configured to implement:

an acquisition unit configured to acquire a first information indicating that a traveling speed of an other vehicle in front of a vehicle is smaller than a predetermined first threshold value and a traffic congestion occurs, and a second information indicating whether an autonomous driving operation of the vehicle is allowable based on a predetermined second threshold value, which is set to be smaller than the first threshold value, as an allowable condition for starting the autonomous driving operation during the traffic congestion using an autonomous driving function of the vehicle; and a display control unit configured to display on the display unit that the autonomous driving operation is not allowable during the traffic congestion when the first threshold value is satisfied in the first information and the second threshold value is not satisfied in the second information, while stopping the driving operation during the traffic congestion, and configured to enable the autonomous driving operation when the first threshold value is satisfied in the first information and the second threshold value is satisfied in the second information, wherein the display control unit:

displays on the display that the autonomous driving operation is not allowed when the traffic congestion has not ended, according to the first information, after stopping the autonomous driving operation;

continues to display on the display that the autonomous driving operation is not allowed in response to determining again, according to the first information, that traffic congestion is occurring ahead of the vehicle after previous traffic congestion has ended, according to the first information; and stops displaying on the display that the autonomous driving operation is not allowed in response to determining, according to the first information, that the traffic congestion does not occurring ahead of the vehicle after the previous traffic congestion has ended, according to the first information.

8. A vehicle display control device for controlling a display configured to display vehicle information comprising a processor and memory configured to implement:

an acquisition unit configured to acquire a first information indicating that a traveling speed of an other vehicle in front of a vehicle is smaller than a predetermined first threshold value and a traffic congestion occurs, and a second information indicating whether an autonomous driving operation of the vehicle is allowable based on a predetermined second threshold value as an allowable condition for starting the autonomous driving operation during the traffic congestion using an autonomous driving function of the vehicle; and a display control unit configured to display on the display unit that the autonomous driving operation is not allowable during the traffic congestion when at least one of the first threshold value in the first information and the second threshold value in the second information is not satisfied, while stopping the autonomous driving operation during the traffic congestion, and configured to enable the autonomous driving operation when the first threshold value is satisfied in the first information and the second threshold value is satisfied in the second information;

wherein the display control unit:

displays on the display that the autonomous driving operation is not allowed when the traffic congestion has not ended, according to the first information, after stopping the autonomous driving operation;

continues to display on the display that the autonomous driving operation is not allowed in response to determining again, according to the first information, that traffic congestion is occurring ahead of the vehicle after previous traffic congestion has ended, according to the first information; and stops displaying on the display that the autonomous driving operation is not allowed in response to determining, according to the first information, that the traffic congestion does not occurring ahead of the vehicle after the previous traffic congestion has ended, according to the first information.

9. A vehicle congestion determination device comprising a processor and memory configured to implement:

an acquisition unit configured to acquire a first information indicating that a traveling speed of an other vehicle in front of a vehicle is smaller than a predetermined first threshold value and a traffic congestion occurs, and a second information indicating that the traffic congestion occurs based on a predetermined second threshold value as an allowable condition for starting an autonomous driving operation of the vehicle during the traffic congestion using an autonomous driving function of the vehicle; and a control unit configured to execute a first algorithm for determining an occurrence of the traffic congestion based on the first threshold value and a second algorithm for determining the occurrence of the traffic congestion based on the second threshold value;

wherein the control unit:

determines whether to display on a display the first information and the second information that the autonomous driving operation is not allowable during the traffic congestion, based on a result of the first algorithm and a result of the second algorithm, while stopping the autonomous driving operation during the traffic congestion, and enables the autonomous driving operation when the first threshold value is satisfied in the first information and the second threshold value is satisfied in the second information;

displays on the display that the autonomous driving operation is not allowed when the traffic congestion has not ended, according to the first information, after stopping the autonomous driving operation;

continues to display on the display that the autonomous driving operation is not allowed in response to determining again, according to the first information, that traffic congestion is occurring ahead of the vehicle after previous traffic congestion has ended, according to the first information; and stops displaying on the display that the autonomous driving operation is not allowed in response to determining, according to the first information, that the traffic congestion is not occurring ahead of the vehicle after the previous traffic congestion has ended, according to the first information.

* * * * *